Feb. 14, 1933.   C. G. BUTLER   1,897,660
CONDUIT COUPLING AND LUBRICANT FLOW CONTROL DEVICE
Original Filed Jan. 13, 1930
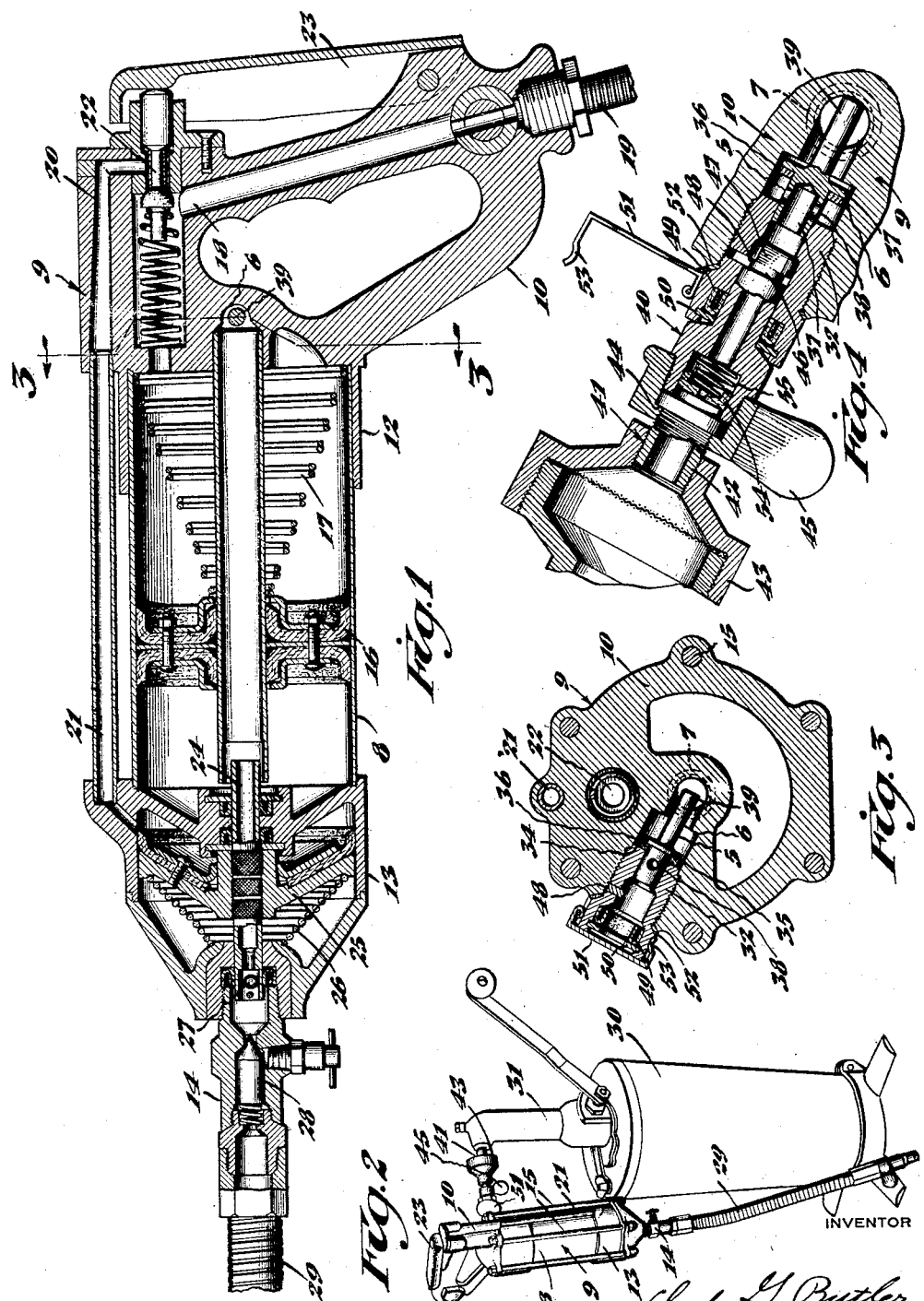
INVENTOR
Clyde G. Butler
BY
Wood & Wood   ATTORNEYS Patented Feb. 14, 1933

1,897,660

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

CONDUIT COUPLING AND LUBRICANT FLOW CONTROL DEVICE

Original application filed January 13, 1930, Serial No. 420,315, now Patent No. 1,851,926, of March 29, 1932. Divided and this application filed April 13, 1931. Serial No. 529,644.

This invention relates to lubricating apparatus and is particularly directed to a coupling device for filling or loading a portable grease gun from a supply bucket or tank. The portable grease gun to which the filling device of this invention is applied including a low pressure grease chamber or reservoir from which the grease is fed to the environment of a high pressure cylinder has been described and claimed in co-pending application Serial No. 327,677 filed by Clyde G. Butler on December 21, 1928 now Patent No. 1,854,688 of April 19, 1932 and application Serial No. 420,315 filed by Clyde G. Butler January 13, 1930 now Patent No. 1,851,926 of March 29, 1932, of which latter case the present application is divisional. The filling device of this invention is designed for use for loading any type of grease gun from a large tank or bucket and for this purpose includes complementary and connectable parts located on the bucket and on the gun.

It is, therefore, an object of this invention to provide an improved filling coupler means and valve for filling a grease gun whereby the gun may be quickly and easily connected to a grease bucket for a filling operation and whereby the connection between the grease bucket and the pump is firmly established for an efficient non-leaking filling operation.

It is another object of this invention to provide an improved valve for controlling the filler inlet to the grease gun for efficiently closing the same under the normal action of the parts of the grease gun when the filling and coupling parts on the supply bucket have been detached or withdrawn.

Other objects and certain advantages will be more fully apparent from a description of the accompanying drawing, in which:

Figure 1 is a longitudinal sectional view of the grease gun to which the coupling attachment is applied for the purpose of loading the grease gun.

Figure 2 is a perspective view showing the grease gun attached to the filling nipple of the grease bucket during a filling operation.

Figure 3 is a sectional view taken on line 3—3, Figure 1, showing the arrangement of the filling inlet control valve and socket for receiving the filling nipple of the supply bucket, which parts are located within the grease gun radially of and communicating with a central filling tube thereof.

Figure 4 is a view taken similar to Figure 3 but showing the valve in open position with the filling nipple inserted and the parts complemented for a filling operation.

The filling inlet control valve 5 which is mounted within the grease gun is located in a radially disposed inlet passageway 6 communicating with the rear end of a filling and support tube 7 concentrically disposed within the reservoir barrel 8 of the grease gun 9.

In view of the description and claims in the co-pending applications on the grease gun, the present description will be general relative to the grease gun and only for the purpose of showing the full combination of the complementary filling and coupling parts relative to the grease gun. The grease gun consists mainly of a handle element 10, the reservoir barrel 8 mounted within a cylindrical sleeve 12 of the handle, a high pressure developing air piston cylinder 13 at the forward end of the gun, and a high pressure cylinder 14 for the grease discharge mounted at the forward end of the gun. The parts 10 and 13 are secured together upon the barrel or main cylinder by means of tie rods 15. The grease reservoir includes the concentrically located tube 7 which is supported from the handle and communicates directly with the radial filling passageway 6 within the handle. A low pressure or booster piston 16 is slidably mounted within the reservoir barrel 8 and upon the filling tube, this piston being urged toward the forward end of the reservoir barrel by means of a coil spring 17 under compression and by means of air. The forward end of the central tube 7 communicates with the grease chamber in front of the piston 16.

Air is constantly supplied to the rear end of the low pressure piston through an air passageway 18 extending through the handle and supplied through an attached flexible conduit 19. A supply passageway 20 for the high pressure developing cylinder 13 extends from the main air passageway in the handle through a tube 21 extended between the handle portion and the high pressure air cylinder, this passageway 20 containing a valve 22 which is operated by means of a trigger lever 23 pivoted on a handle, this valve in one position exhausting the high pressure developing cylinder and in the other position permitting air flow thereto.

The large area high pressure developing piston 25 carries a tubular plunger 24 journalled in the end walls of the cylinder, this tubular plunger furnishing communication between the grease supply chamber and the high pressure grease discharge cylinder 14 located at the forward end of the gun. The high pressure developing piston 25 is moved for a discharge stroke by means of the introduced air supply at its rear and is returned by means of a coil spring 26 engaging its forward side. The forward end of the tubular plunger is closed, by means of a ball valve 27, on the forward or feed stroke to forcibly eject the contents of the high pressure cylinder. This valve 27 is opened on the retractive stroke of the plunger to permit the grease to flow from the grease chamber into the high pressure chamber. An outlet valve 28 is contained in the nose element or high pressure cylinder 14, this valve opening to grease expulsion forces and closing to retractive movement of the plunger to prevent uncontrolled grease flow and withdrawal from the discharge tube 29 of that grease which has been previously expelled.

The gun 9 is loaded from a grease bucket 30 by means of a pump 31 in the grease bucket. Figures 3 and 4 detail the coupling means between the gun and the bucket pump discharge passageway. A valve supporting socket sleeve 32 is screwed into the radially extending bore 6 communicating with the tube 7, the grease being forced into the gun through these parts. The valve 5 is slidably mounted in this element and is held in place against the abutment 34, formed by the inner end of the sleeve in a bore by virtue of the pressure of the air and spring against the follower plate or booster piston 16 in the reservoir cylinder 8 acting through the medium of the grease. The valve has an intermediate flange 35 which seats upon a leather washer 36 engaging the end or abutment of the socket. The end of the valve within the sleeve is tubular (see Figure 4) and the base of the bore 37 thereof is provided with radial apertures 38. The other end of the valve includes a shank or stud 39 extending radially into the tube, this stud functioning as a stop means in combination with the inner wall of the inlet for limiting inward or opening movement of the valve.

As the grease is forced into the tubular end of the valve, the valve is slid outwardly from the bore of the sleeve socket and the grease is forced through the radial openings 38 into the tube, the valve immediately closing when the forcing of the grease is discontinued.

A plug 40 is attached to the discharge conduit 41 of the grease bucket. This plug is rotatably mounted relative to the conduit. The rotatable connection is to a headed sleeve 42 extending from a filter 43 inserted in the conduit. The head end of the sleeve abuts an interior flange 44 at one end of the bore of a rotatable handle 45 for the plug 40. The other end of the bore is screw-threaded to receive the plug 40, the plug being screwed in sufficiently to be rigid in position but to leave some clearance for rotation thereof with the handle on the sleeve.

The plug 40 is provided with an annular groove 46 toward its outer end and a portion of the plug beyond the groove is flattened at one side as at 47. A lock piece 48 of slightly less thickness than the width of the groove is disposed in the socket transversely across the side of the bore thereof. The plug is inserted with the flattened portion thereof aligned with the lock piece and after this portion is past the piece, the plug is rotated and it is thereafter impossible to withdraw the same unless returned to the original rotative position of insertion. A packing 49 is secured in a counterbore of the socket, being held in position by means of a washer 50, sprung into place, so that there can be no leakage past the engaging surfaces of the plug and socket.

As shown, closed in Figure 3 and open in Figure 4, a cap 51 is provided for the socket. This cap is hinged to a washer 52 secured between the head of the socket 32 and the body of the gun 9. An extension 53 of the cap, which extension is sprung outwardly when the cap is closed, frictionally engages the side of the socket head and binds the cap in closed position. Packing 54 is also provided between the sleeve 42 and the plug 40, this packing being of the cupped washer type urged against the end of the sleeve by means of a spring 55 under compression. This cup washer laterally engaging the wall of the plug prevents any leakage from the interior of the conduit past the rotatable connection.

When the reservoir of the gun is empty, the cap 51 covering the intake opening extending into the reservoir is opened and the gun is positioned on the discharge plug or nipple 40 of the grease bucket 30. This plug or nipple 40 enters into the socket 32 of the gun and past the lock piece 48, and when the lock piece is disposed in the annular groove, the handle is rotated to move the flattened portion of the plug out of alignment with the lock piece.

It will readily be apparent that this filling device is adaptable for high speed filling of the gun, insertion being quick and the coupling being efficient. As the pump 31 of the grease bucket is operated and the valve within the socket 32 is depressed against the mass of grease which is compacted under spring and air pressure, or spring pressure alone if the air is cut off, the grease will flow through the radial apertures into the axial tube. The effect of loading the gun through the tube is to thoroughly flush the region into which the plug piston 24 moves and break up any pockets or voids at this point. As the grease is fed into the gun, the follower plate is urged back against the compacting pressure until the chamber is substantially filled. As soon as the pumping action is terminated, the body of grease under the action of the follower plate is active to close the valve immediately, and the gun can then be removed from the nipple and the cap closed.

Having described my invention, I claim:

1. A coupling for filling a grease gun, the gun having a bore through the wall thereof adapted to receive the filling nipple of the coupling therein, comprising, a socket-like coupling member mounted in the bore in the wall of the gun, a filling device, a cooperating coupling nipple on the end of the filling device adapted to be inserted in said socket-like member, and a free floating valve having a substantially centrally located flange therein adapted to seat against the end of said socket-like coupling member when the valve is in closed position, said valve adapted to be held in closed position by back pressure in the grease gun and adapted to be opened against back pressure by pressure in the filling nipple.

2. A coupling for filling a grease gun, the gun having a bore through the wall thereof adapted to receive the filling nipple of the coupling therein, comprising, a socket-like coupling member secured in the bore of the wall of the gun, a filling device, a cooperating coupling nipple on the end of the filling device adapted to be inserted in said socket-like member, a free floating valve slidably mounted in said socket-like member and having a substantially centrally located flange thereon adapted to seat against a portion of said socket-like coupling member when the valve is in closed position, said flange of the valve providing a relatively large area disposed for action thereon by back pressure in the grease gun whereby the valve is firmly urged against its seat, said valve adapted to be opened by filling pressure from the nipple.

3. A coupling for filling a grease gun, the gun having a bore through the wall thereof adapted to receive the filling nipple of the coupling therein, comprising, a socket-like coupling member secured in the bore in the wall of the gun, a filling device, a nipple on the end of the filling device cooperating with the socket-like coupling member and adapted to be inserted therein, a free floating valve slidably mounted in said socket and having a substantially centrally located flange thereon adapted to seat against the end of the socket-like coupling member when the valve is in closed position, said valve including a stud extending from its inner end, and a stop in the bore of the gun for limiting opening movement of the valve by contact of the stud therewith, said valve providing a relatively large area disposed toward the grease pressure in the gun and adapted to be seated by back pressure of this grease and opened by filling pressure from the nipple.

In witness whereof, I hereunto subscribe my name.

CLYDE G. BUTLER.